Dec. 11, 1962 H. F. MISEROCCHI 3,068,166
REVERSAL TRAY FOR WATER TREATING DEVICES AND THE LIKE
Filed Sept. 21, 1960 7 Sheets-Sheet 1

FIG. 1

INVENTOR
HENRY FELIX MISEROCCHI
BY
ATTORNEY

INVENTOR
HENRY FELIX MISEROCCHI
BY
ATTORNEY

INVENTOR
HENRY FELIX MISEROCCHI
BY
ATTORNEY

Dec. 11, 1962 H. F. MISEROCCHI 3,068,166
REVERSAL TRAY FOR WATER TREATING DEVICES AND THE LIKE
Filed Sept. 21, 1960 7 Sheets-Sheet 6

INVENTOR
HENRY FELIX MISEROCCHI
BY
ATTORNEY

Dec. 11, 1962     H. F. MISEROCCHI     3,068,166
REVERSAL TRAY FOR WATER TREATING DEVICES AND THE LIKE
Filed Sept. 21, 1960     7 Sheets-Sheet 7

FIG. 18

INVENTOR
HENRY FELIX MISEROCCHI
BY
ATTORNEY

United States Patent Office 3,068,166
Patented Dec. 11, 1962

3,068,166
REVERSAL TRAY FOR WATER TREATING
DEVICES AND THE LIKE
Henry Felix Miserocchi, Old Greenwich, Conn., assignor to The American Machine & Foundry Company, a corporation of New Jersey
Filed Sept. 21, 1960, Ser. No. 57,491
10 Claims. (Cl. 204—301)

This invention relates in general to fluid treatment devices and, more particularly, to electrodialysis apparatus.

An object of this invention is to provide a compact, efficient, dependable, economical electrodialysis apparatus which is particularly suitable for home water purification.

Another object of this invention is to provide a complete electrodialysis apparatus which may be built at a moderate cost so that it may be sold for home use.

Yet another object of this invention is to provide a compact electrodialysis apparatus which is easy to service when service is required but which will operate for a long period of time without requiring any servicing.

Still another object of this invention is to provide an efficient, simple, rugged and inexpensive product and concentrate stream reversal valve.

A further object of this invention is to provide, in an electrodialysis apparatus, a unit which will automatically electrically reverse an electrodialysis stack, purge the stack, and then reverse or interchange the product and concentrate streams emerging from the stack.

A principal object of this invention is to reverse an electrodialysis stack electrically within optimum time limits to achieve unexpected advantages in the operation of the stack.

A still further object of this invention is to provide a complete encased electrodialysis apparatus which utilizes heat generated by electrical components to ventilate the enclosed apparatus by means of convection currents to prevent a build up of explosive gases such as hydrogen, which are liberated at the electrodes of the electrodialysis stack.

An additional object of this invention is to provide an electrodialysis stack which requires few external hydraulic connections so that it may be easily installed and so that it may be easily removed for servicing.

Yet a further object of this invention is to provide a complete electrodialysis apparatus utilizing modular construction so that the apparatus may be easily assembled and serviced.

Additional objects, advantages and features of invention reside in the construction, arrangement and combination of parts involved in the embodiment of the invention and its practice as will be understood from the following description and accompanying drawing wherein.

Referring to the drawing in detail, FIGS. 1, 2, 3 and 5 show the generally rectangular cabinet 20 which consists of a rear wall 21, the side walls 22 and 23 extending forward from rear wall 21, a top wall 24 and a bottom wall 25. The forwardly disposed portion of the bottom wall 25 terminates in an upwardly and forwardly curving portion 26. The front cover 27 of the cabinet 20 has the short downward bend 28 formed in its top wall 29 which hooks into the trough 30 formed in the forward edge of top wall 24. The bottom flange 31 of front cover 27 extends beneath the upward and forwardly disposed portion 26 of the bottom wall 25. The whole lower portion of cabinet 20 is water tight and has the drain fitting 32 fixed to bottom wall 25 so that any fluid in the bottom of cabinet 20 will flow through an aperture 35 in the bottom wall 25, through drain fitting 32 and out drain pipe 34.

Brackish water to be treated by electrodialysis flows into cabinet 20 through the pipe or tubing 36 which curves downward to enter the filter 37 which may be a conventional or any other type of water filter designed to remove solid impurities from the incoming water. After leaving filter 37, the brackish water passes through the solenoid valve 38, the pressure reducing or regulating valve 39 and the low pressure cut off switch 40. By merely undoing the tubing connections 41 and 42 the entire filter, solenoid valve, regulating valve, and pressure switch assembly can be removed as a single unit for servicing. The bracket 43 which depends from the horizontal bulkhead 44 supports this removable unit.

Figures 6, 7, 8:
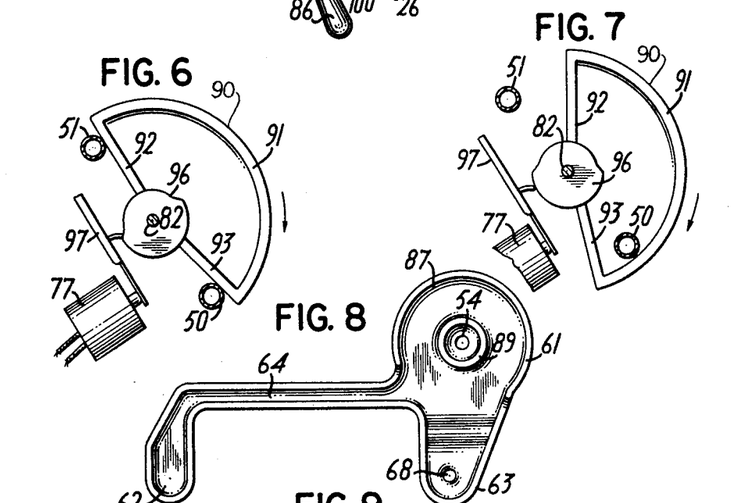
FIG. 6 is a top view of the diverter valve tray and the electrical reversing cam shown in the stack purging position.
FIG. 7 is a top view of the diverter valve tray and the electrical reversal cam shown in a flow position.
FIG. 8 is a top view of the diverter drain pan.

After passing the pressure switch 40, incoming brackish water is conducted through the tube 45 into the electrodialysis stack 100. Two outflow tubes 50 and 51 lead from the electrodialysis stack 100 to the reversal and diverter assembly generally designated by the numeral 60. Referring also to FIG. 8, it may be seen that a diverter drain pan 61 has the two forwardly extending projections 62 and 63 which are connected by a channel 64. The electrodialysis stack 100 fits between the projections 62 and 63 and the stack has projecting from its upper end the electrode stream outlet tubes 65 and 66 which drain, respectively, into the forwardly extending projections 62 and 63. Fluid draining into the projection 62 flows through the channel 64 into the projection 63 which has affixed to it the drain tube 67 which drains the projection 63 and thus the entire diverter drain pan 61 through the aperture 68. The drain tube 67 carries fluid draining from the drain pan 61 to the bottom of cabinet 20.

Figure 1:
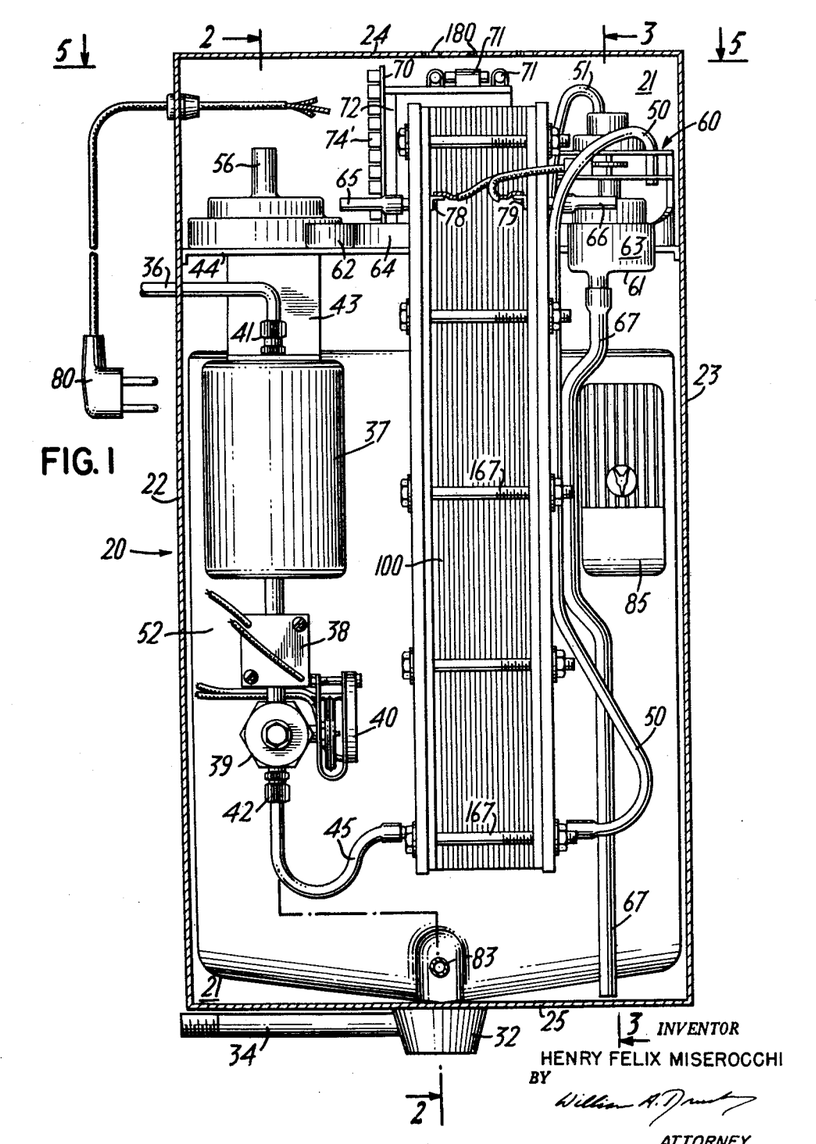
FIG. 1 is a front view of the electrodialysis apparatus with the front portion of the cabinet broken away in section and with some electrical leads broken away.
Figure 2:
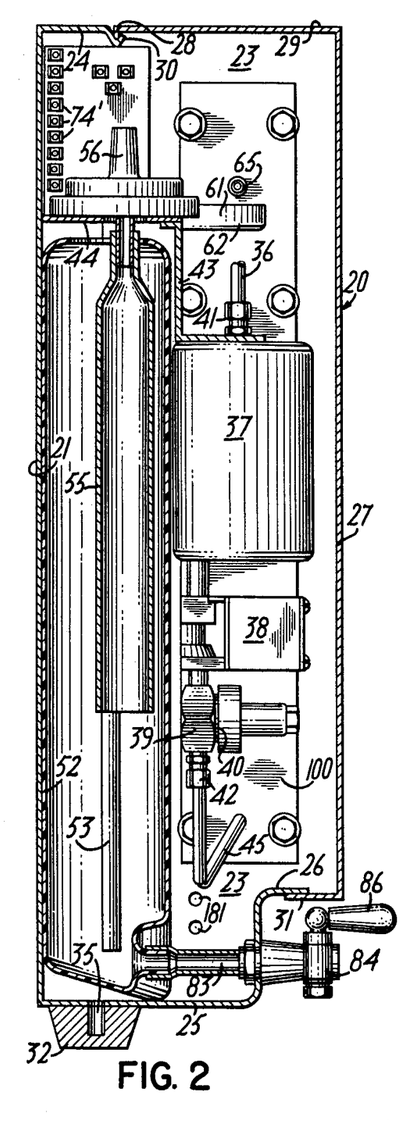
FIG. 2 is a vertical section taken on line 2—2 of FIG. 1.
Figure 3:
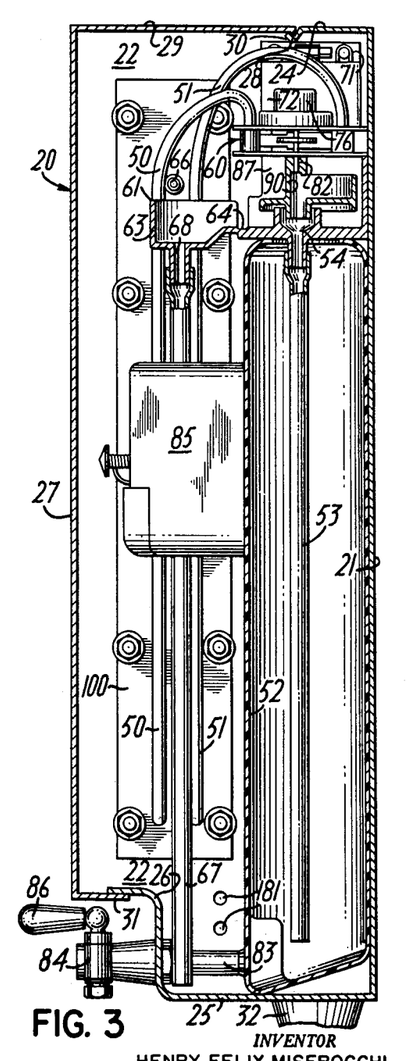
FIG. 3 is a vertical section taken on line 3—3 of FIG. 1.

Referring now to FIGS. 1, 2 and 3, within the rearmost portion of cabinet 20 there is disposed the product storage tank or reservoir 52. The product stream tube 53 conducts treated water from the diverter and electrical reversal unit 60 through an aperture 54 of the diverter drain pan 61. Also extending downward into the top of the product storage reservoir 52 is the air trap 55 which activates the fluid level switch 56 which is mounted on the horizontal bulkhead 44. A pipe 83 leads from the bottom of the tank 52 to a valve 84 through which treated water is drawn for consumption by turning the handle 86. Mounted directly behind the top of the electrodialysis stack 100 is the terminal board 70 behind which there is located the transformer 72 above which the rectifiers 71 are mounted. A number of connections 74 are connected to a number of taps from transformer 72 so that current of a desired voltage may be drawn from transformer 72 by electrically wiring the stack to a given connection 74.

Figure 4:
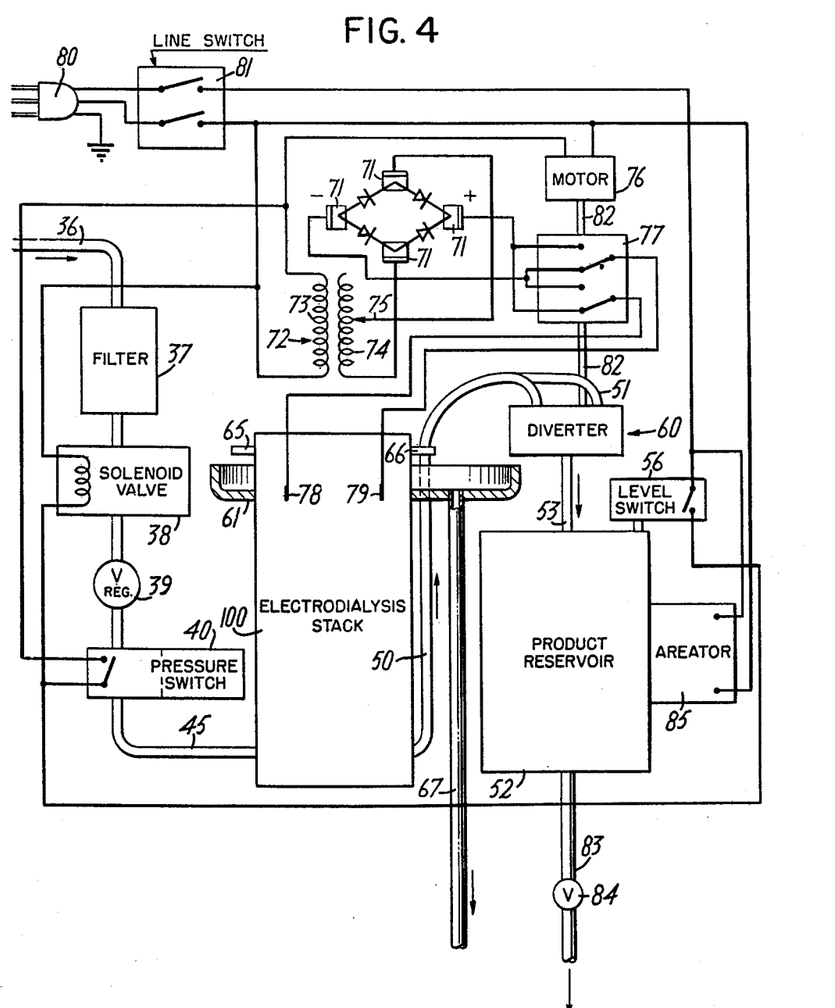
FIG. 4 is a combined hydraulic flow diagram and electrical wiring diagram of the electrodialysis apparatus.
Figure 5:
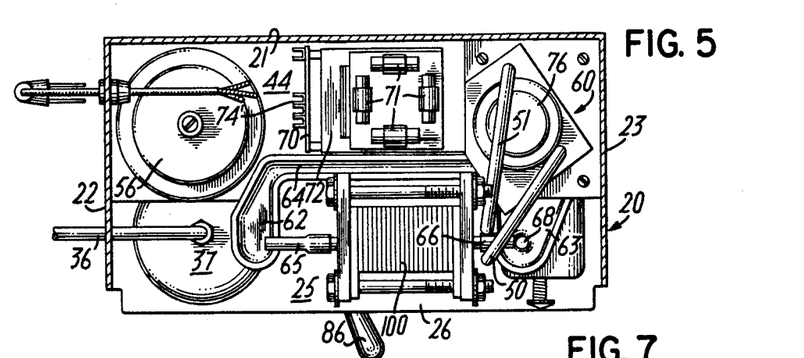
FIG. 5 is a horizontal section taken on line 5—5 of FIG. 1.

Referring now to FIG. 4, this apparatus operates as follows. The plug 80 is connected to a suitable alternating current source. A line switch 81 is closed to activate the unit. When line switch 81 is closed and the product reservoir 52 is empty or filled below a level which opens level switch 56, the level switch 56 is closed to activate the solenoid valve 38 so that brackish water may flow in through pipe 36 through filter 37, solenoid valve 38, the pressure reducing or regulating valve 39 and then past the pressure switch 40 into the electrodialysis stack 100 through the pipe 45. Should the pressure fail in pipe 36 or should it fall to such a low value that the electrical operation of electrodialysis stack 100 would damage it, the low pressure switch 40 would open so that the electrodialysis stack would not be electrically activated. Under normal conditions, pressure switch 40 is closed so that it activates the primary coil 73 of the transformer 72 and also the motor 76 which operates the diverter 60 in a manner which will be described. From the secondary coil 74 of the transformer 72 a suitable tap 75 extends to the four rectifiers 71 which produce a direct current. This direct current leads through the double pole, double throw reversing switch 77 which forms a part of the diverter and is activated by the motor 76 in a manner which will be described.

From the switch 77 a direct current flows to the electrical connections 78 and 79 of the stack 100. The activation of switch 77 merely reverses the direct current flow to stack 100. By connecting the lead 75 to different connections 74′ and thus to different taps from transformer 72, different voltages may be applied to the stack 100. Different operating conditions of different stacks 100 may require different voltages for their most efficient operation.

A product and a concentrate stream flow from the stack 100 through the pipes 50 and 51 and the diverter 60 directs the product stream from the stack into the product reservoir. When the product reservoir fills to a pre-set level, level switch 56 opens disconnecting the electrical elements of the apparatus and it allows solenoid valve 38 to close and stop the flow of brackish water into the apparatus.

Referring also to FIGS. 1, 2, 3 and 4, the valve 84 may be opened to draw treated water from tank 52 for home consumption. If it is desired, a unit 85 may be connected directly across the leads from line switch 81. The unit 85 may be an aerator, a cooling unit, or any other piece of apparatus which would render the treated water in the product reservoir more desirable to the consumer. The unit 85 is, however, optional in that it may or may not be required depending upon the particular conditions under which the apparatus is used.

Figure 9:
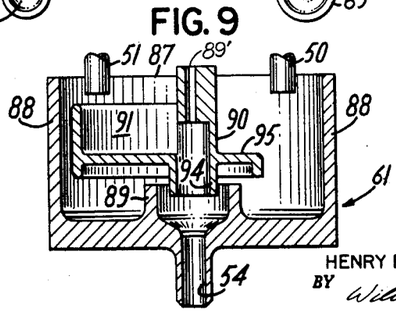
FIG. 9 is a vertical section through the diverter valve.
Figure 10:
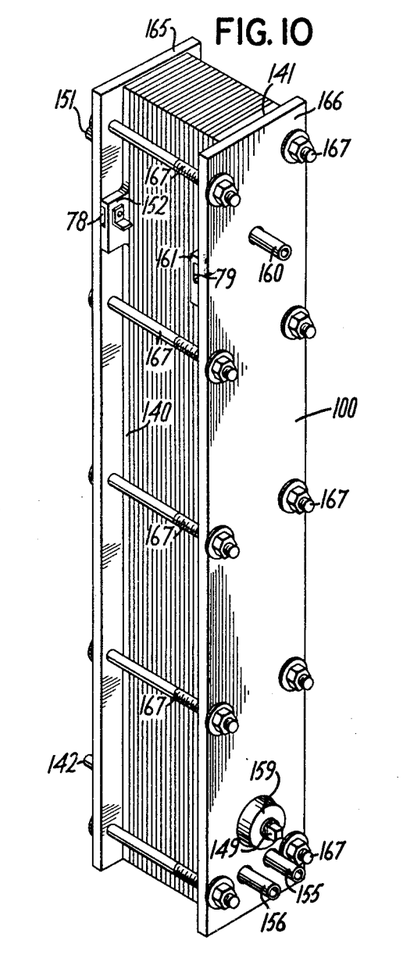
FIG. 10 is a perspective view of an electrodialysis stack according to this invention.

Referring now to FIGS. 3, 4, 6, 7, 8 and 9, the diverter and electrical reversal unit 60 operates as follows. The rear-most portion of the diverter drain pan 61 consists of a generally circular portion 87 more than one-half enclosed by a higher wall portion 88. In the center of the circular portion 87 about the central aperture 54 there is disposed the low circular wall 89. Supported above the high semicircular wall 88 of the circular portion 87 there is the electric timing motor 76 from which there extends a shaft 82 directly downward above the aperture 54 in the diverter drain pan 61. The lower end of the shaft 82 extends into the aperture 89′ in the diverter valve tray 90. As seen in FIGS. 6, 7 and 9, the tray 90 has a semi-circular wall 91 and walls 92 and 93 which form an angle somewhat less than 180 degrees. A channel 94 extends from the tray 90 and drains it directly below the termination of the motor shaft 82 into the aperture 54 in drain pan 61. A smaller semicircular apron 95 extends for more than 180 degrees to prevent any splashing fluid from entering aperture 54 except from tray 91. The tubes 51 and 50, which lead from stack 100, terminate 180 degrees apart on either side of shaft 82. Therefore, as seen in FIG. 9, the fluid in one tube 51 or 50 will drain into tray 90 and through channel 94 into aperture 54 while the fluid in the other tube drains directly into the bottom of the generally circular portion 87 of the diverter drain pan 61. The fluid which is draining into the bottom of the drain pan 61 will flow along the bottom of drain pan 61 and out aperture 68 to drain through drain tube 67 into the bottom of cabinet 20. The fluid which drains into drain tray 90 will flow through aperture 54 and the product stream tube 53, as shown in FIG. 3, into the product storage tank 52.

Above the diverter valve tray 90, also mounted on shaft 82, is the cam 96 which has one side recessed. A spring loaded follower 97 rides on the cam 96 and activates the two pole, double throw switch 77 which is shown in FIG. 4. If the timing motor 76 drives shaft 82 through one revolution each hour, when the tray 90 is in the position shown in FIG. 6, the fluid in both tubes leading from stack 100 will flow beyond tray 90 to drain into cabinet 20 while the stack is purged of its liquid content. As tray 90 revolves clockwise from the position shown in FIG. 6, electrical reversal is accomplished by switch 77 while the stack is thus purged of its fluid content.

As tray 90 passes under tube 50, fluid from tube 50 will drain into tray 90 and thus into the product storage tank 52. After tray 90 revolves through almost 180 degrees and a period somewhat less than one-half hour passes, cam 96 will again activate switch 77 to electrically reverse stack 100 while tubes 50 and 51 will again discharge beyond tray 90 to purge stack 100 immediately after its electrical reversal. In this manner the diverter 60 twice each hour electrically reverses and purges the stack 100. The stack 100 must be purged or have the fluid flowing through both tubes 50 and 51 drain out and not pass into the product storage tank because, at the very moment of electrical reversal, each concentrating cell becomes a diluting cell and each diluting cell becomes a concentrating cell. Thus the diluting cells which communicate with the product storage tank directly after reversal are full of concentrate and, for a short period, both tubes 50 and 51 should drain so as not to contaminate the contents of the product storage tank 52.

Other methods of simultaneously reversing the electrical polarity of the stack and the distribution of product and waste streams to separate reservoirs may be used without departing from the scope of this invention. For example, a float in product reservoir 52 may utilize the buoyant force upon it to activate an electrical reversing switch each time the reservoir 52 is filled, and simultaneously move the product and waste stream tubes to positions which will maintain the product stream flow to the product reservoir 52 and the waste stream flow to the bottom of the cabinet 20. Another method would utilize a manually operated combination switch and tube diverter assembly to simultaneously reverse the electrical polarity and the distribution of the product and waste streams.

Figure 11:
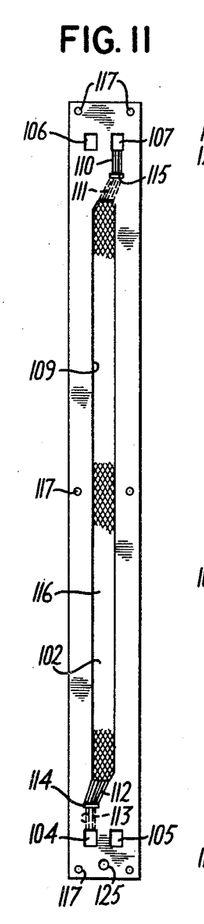
FIG. 11 is a plan view of an electrodialysis stack gasket.
Figure 12:
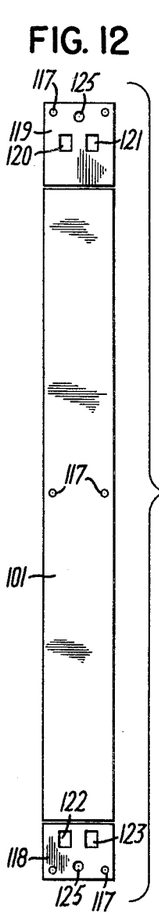
FIG. 12 is a plan view of an electrodialysis stack membrane with end spacers shown in position.
Figure 13:
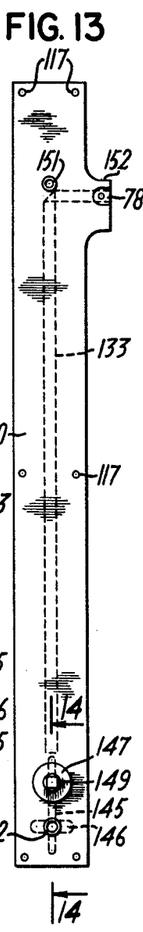
FIG. 13 is a plan view of an inlet plate.
Figure 14:
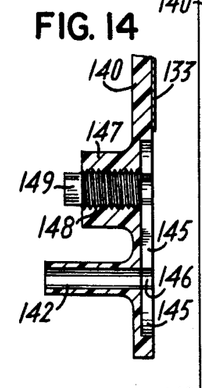
FIG. 14 is a section taken on line 14—14 of FIG. 13.

Referring now to FIGS. 11 through 18, the electrodialysis stack 100 is built up from a series of membranes 101 which are interspersed between the gaskets 102. As shown in FIG. 11, each gasket 102 contains four fluid flow apertures 104, 105, 106 and 107. The oppositely disposed fluid flow apertures 104 and 107 communicate with the large central cut out portion 109 by means of the grooves 110, 111, 112 and 113. The fluid flow aperture 107 communicates with the large central cut out portion 109 through the grooves 110 which are formed on one side of the gasket 102, the aperture 115 which extends through the gasket 102, and the grooves 111 which are formed on the opposite side of gasket 102 from the grooves 110. In a like manner, aperture 104 communicates with the large central cut out portion 109 by means of the grooves 113, the through aperture 114, and the grooves 112. The screen spacer 116, preferably of expanded plastic, is placed within each large cut out portion 109 to space the adjacent membranes 101 and to promote turbulent flow within each gasket. Each gasket 102 contains the alignment apertures 117 through which rods may be passed to assist in the assembly of a stack. Disposed at each end of each membrane 101, are the end spacers 118 and 119. Each end spacer contains two fluid flow apertures 120 and 121 or 122 and 123. The end spacers also contain the alignment apertures 117 as does the membrane 101. At one end of each gasket 102 there is formed a large, single, centrally located fluid flow aperture 125. Each end spacer 118 or 119 contains a corresponding fluid flow aperture 125.

Figure 18:
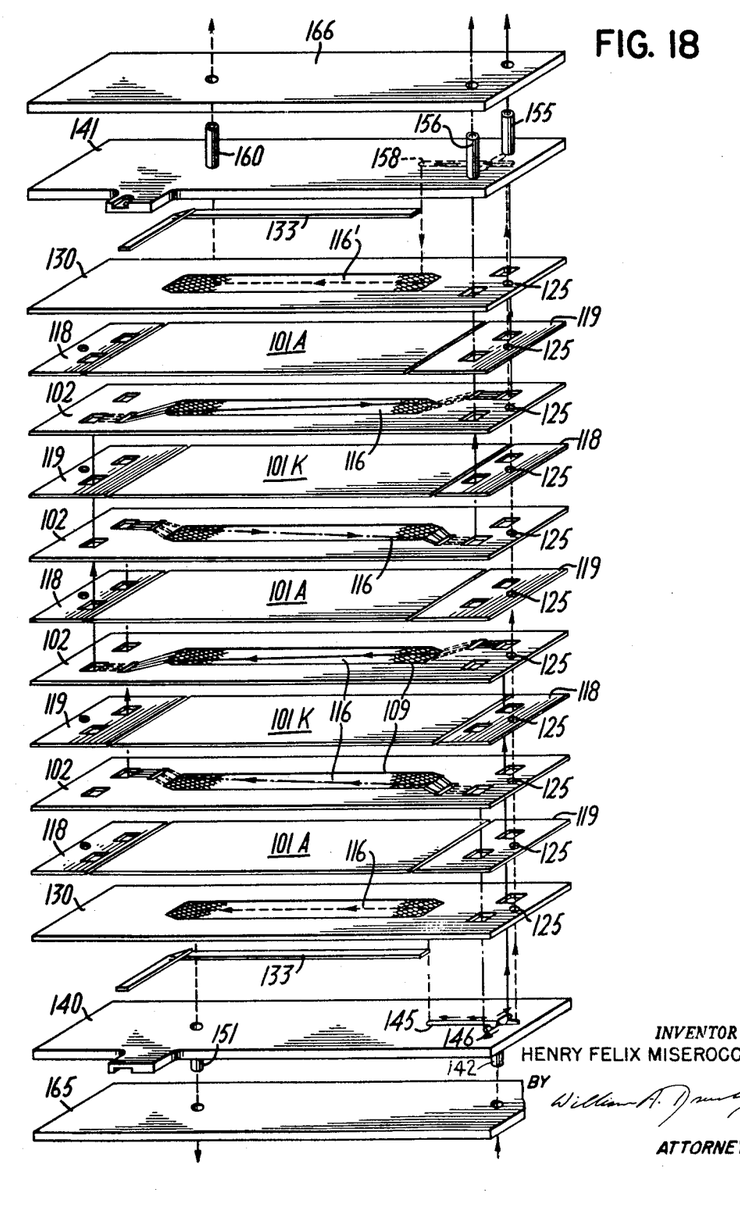
FIG. 18 is an exploded perspective view of the elements forming an electrodialysis stack according to this invention.

Referring now to FIG. 18, alternate layers of gaskets 101 are interspersed between membranes 101A and 101K. The membranes 101A are anion permeable membranes while the membranes 101K are cation permeable membranes. Alternate gaskets 102 are inverted about their longitudinal axis and they may then be assembled as shown to form as many cells as is desired. If certain gaskets 102 are formed without a given fluid flow aperture 104, 105, 106 or 107, series flow may result within the stack as shown in FIG. 18. By assembling the gaskets 102 in the proper sequence with or without all their fluid flow apertures, series flow, parallel flow, or a combination of series or parallel flow through a series of adjacent gaskets may be achieved. Different flow patterns and different combinations of gaskets and membranes may be required for different applications.

Figures 15, 16, 17:
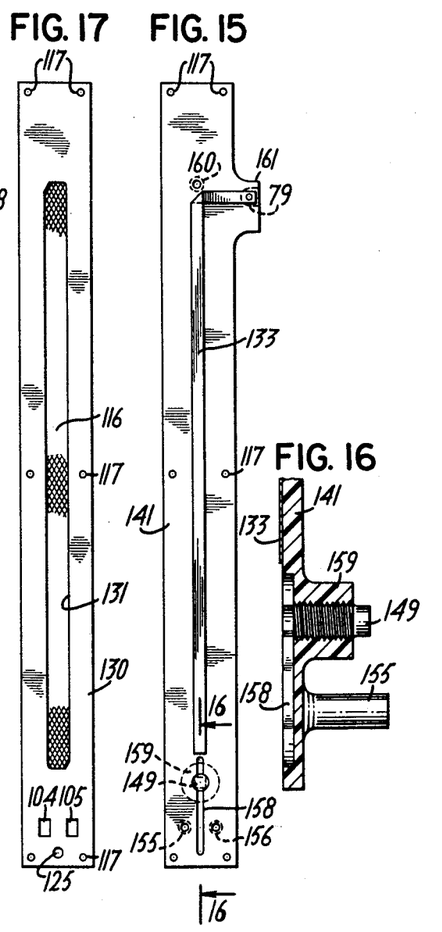
FIG. 15 is a plan view of an outlet plate.
FIG. 16 is a section taken on line 16—16 of FIG. 15.
FIG. 17 is a plan view of an electrode chamber gasket.

In the preferred embodiment of the invention, the gaskets 102 are .040 inch thick. Disposed at each end of the gaskets 102 and the membranes 101 are the two electrode chamber forming gaskets 130 as shown in FIG. 17 and FIG. 18. These electrode gaskets 130 contain the two fluid flow apertures 104 and 105. They also contain the alignment apertures 117 and the large single fluid flow aperture 125. The electrode compartment forming gaskets 130 are twice as thick as the stack gaskets 102. As shown in FIG. 18, thin strips of platinum foil about .001 inch thick form the electrodes 133. These electrodes are disposed away from the membranes adjacent to the electrode compartments. If the screen spacers 116 are formed from a sheet of expanded plastic, the direction of expansion of the material which forms the screen spacers 116 may be substantially along the length of the screen spacers 116. These screen spacers 116 will be approximately 40/1000 of an inch thick to fill the cut out portions 109 of the gaskets 102. Since the electrode compartments and the electrode compartment forming gaskets 130 are twice as thick as the cut out portions 109 and the stack gaskets 102, two screen spacers should be placed within each electrode compartment. The outermost screen spacer disposed toward the electrode 130 which is designated in FIG. 18 by the numeral 116', may be expanded in a direction substantially extending across the width of the screen spacers. When plastic material is expanded across rather than along the length of a screen spacer, fluid flow will be more rapid. Thus by placing two screen spacers 116 and 116' in each electrode compartment with the screen spacer 116 which is expanded substantially in the direction of its length adjacent to the membrane and the screen spacer 116' which is expanded substantially across its width adjacent to the electrode 133, slower more turbulent flow is promoted adjacent to the membrane while more rapid scrubbing flow is promoted adjacent to the electrodes 133.

Disposed beyond the electrode compartment forming gaskets 130 are the plastic fluid flow inlet and outlet plates 140 and 141 which are shown in FIGS. 10, 13, 14, 15, 16 and 18. Fluid enters the stack 100 through the tubular projections 142 to which the tube 45 is connected. On the inside of the inlet plate there are formed the two grooves 145 and 146 which are at right angles to each other, which intersect beneath the tubular projection 142, and which are both communicated with by the tubular projection 142 at their intersection. The upward extension of groove 145 communicates with the adjacent electrode compartment. A boss 147 contains the internal threads 148 into which a pipe plug 149 may be turned to partially block the groove 145 and control the amount of fluid flow into the electrode compartment adjacent to the inlet plate 140. The horizontal groove 146 directs fluid from the tubular extension 142 to both sides to enter the fluid flow apertures 104 and 105 in the adjacent gasket 130. Extending outward from the upper end of the inlet plate 140 is the tubular extension 151 which has the outlet tube 65 fixed to it. A side extension 152 of the inlet plate 140 has a folded end of the foil electrode 133 fixed to it to form the electrical contact 78 with the stack 100.

The outlet plate 141 has the two tubular extensions 155 and 156 extending outward from its lower end and communicating with the fluid flow apertures 104 and 105 in the adjacent electrode compartment forming gasket 130. A single vertical slot 158 extends from the large fluid flow aperture 125 in the adjacent gasket 130 and communicates with the electrode compartment next to the outlet plate 141. Another boss 159 has a pipe plug 149 within it so that the fluid flow through the vertical slot 158 into the electrode compartment next to outlet plate 141 may be controlled. At the upper end of outlet plate 141 a tubular extension 160 extends outward and carries the electrode chamber outlet tube 66. Another side extension 161 has the folded end of another foil electrode 133 fixed to it forming the electrical contact 79 with stack 100. Two metal end plates 165 and 166 are clamped on either side of the plastic inlet and outlet plates 140 and 141 by means of the bolts 167. The metal end plates 165 and 166 have apertures formed in them through which the tubular extensions 151, 160, 142, 155 and 156 as well as the bosses 147 and 159 may extend. The end plates 165 and 166 hold the bolts 167 beyond the sides of the stack 100 so that the stack 100 is electrically insulated.

Referring now to FIG. 18, it may be seen that brackish water enters the tubular projection 142 and flows upward into the adjacent electrode compartment through a slot 145 to wash electrode 133 and exhaust through the tubular projection 151. A portion of the fluid flows downward within slot 145 to pass completely through the stack through the fluid flow apertures 125 to enter slot 158 in the outlet plate 141 and flow from slot 158 into the electrode chamber adjacent to the outlet plate 141 to wash the other electrode 133 and then exhaust through the tubular extension 160. In the manner that has been explained, the amount of fluid which is diverted to wash the electrodes is controlled by means of the pipe plugs 149 which are used to constrict the channels 145 and 158. A part of the fluid flowing into the stack through the tubular projection 142 flows through the horizontal slot 146 into the fluid flow apertures in the gaskets 102 and the end spacers. When the electrodes 133 are connected to the direct current source, a product and a concentrate stream will then exhaust through the tubular extensions 155 and 156. When the polarity of the direct current is reversed, the concentrate and the dilute streams will reverse also as they flow from the tubular projections 155 and 156.

By selecting a timing motor 76 which will drive the shaft 82 at a faster or slower rate of speed, the period of time between electrical reversal may either be extended or shortened. It has been found by experiment that the most effective period of time between current reversal is from 15 minutes to 3 hours. A longer period of time than three hours between electrical reversals will allow precipitates to build up to such an extent at the electrode serving as the cathode that electrical reversal may not dissolve them. Since basic precipitates are formed at the cathode and an acid is liberated at the anode, the acid, if the period of reversal is less than 3 hours, will tend to dissolve the basic precipitate formed before the last electrical reversal. This shorter period of time between electrical reversals makes it possible to operate this unit without additional added acid feeding apparatus when the unit is used to treat hard water. This feature results in a great saving in expense and efficiency of operation. In addition, the normal desirable effects of electrical reversal take place within the electrodialysis cells themselves as chelation is reduced at the membrane surfaces and a lower electrical resistance of the stack is maintained.

Since the electrode washing streams move upward within the electrode compartments to exhaust through the outlet tubes 65 and 66, hydrogen gas liberated at the anode escapes into the cabinet 20. As may be seen in FIG. 1, a series of small vent holes 180 are formed in the top wall 24 of cabinet 20 above the rectifier 71 and the transformer 72. Referring now to FIGS. 2 and 3, additional small vent holes 181 are formed in the side walls 23 and 22 of the cabinet 20 near its lower end. Since the transformer 72 and, to a greater extent, the rectifiers 71 liberate a considerable amount of heat during the operation of the stack 100, convection currents will be set up within cabinet 20 so that warmer air will rise to flow out of the apertures 180 as cool air is drawn into cabinet 20 through the lower vent apertures 181. Since these convection currents will always be present while the stack 100 is operating, any hydrogen gas which is liberated within cabinet 20 will be carried out the vent apertures 180 will not build up a concentration into possible dangerous explosive ranges.

While the invention has been disclosed in the best form known, it will nevertheless be understood that this is purely exemplary and that modifications may be made without departing from the spirit of the invention, except as it may be more particularly limited in the appended claims.

What is claimed is:

1. In an electrodialysis apparatus having an electrodialysis stack, electrodes in said electrodialysis stack, a direct current source connected to said electrodes, tubes emerging from said stack carying a product and a concentrate stream, and a current reversal device; a stream diverting means comprising, in combination, a timing motor, a vertical shaft driven by said timing motor, terminations of said tubes disposed on either side of said shaft, a semicircular tray fixed to said shaft receiving flow from said terminations when said tray is below said terminations, said tray containing a channel draining said tray substantially below the center of rotation of said tray, a drain pan fixed below said tray containing a first drain aperture below the center of rotation of said tray and a second drain aperture, the flow from said tray draining through the channel in said tray through the first drain aperture and the flow from said tube terminations beyond said tray draining from the second drain aperture, and means activated by said timing motor reversing the direct current from said direct current source to said electrodes when said tray has turned so that flow from both of said terminations passes beyond said tray.

2. The combination according to claim 1 wherein said semicircular tray has a central portion, two walls extending outward from said central portion, and a circular wall joining the ends of said walls, said walls forming an angle between each other of less than 180 degrees.

3. The combination according to claim 2 wherein said means activated by said timing motor reversing the direct current comprises a cam mounted on said vertical shaft and a two pole, double throw switch connected between said direct current source and said electrodes.

4. In an electrodialysis apparatus having an electrodialysis stack which is periodically electrically reversed, and tubes emerging from said stack carrying a product and a concentrating stream; a stream diverting apparatus comprising, in combination, a timing motor, a vertical shaft driven by said timing motor, terminations of said tubes disposed opposite each other on each side of said shaft, a semicircular tray fixed to said shaft receiving flow from said terminations when said tray is below said terminations, said tray containing a drain aperture disposed substantially in the center of rotation of said tray receiving fluid draining from said tray, said electrodialysis stack being periodically electrically reversed when said semicircular tray completes one-half a revolution and passes beneath one of said tubes 5. In an electrodialysis apparatus having an electrodialysis stack which may be periodically electrically reversed, and tubes emerging from said stack carrying a product and a concentrate stream; a stream diverting apparatus comprising, in combination, a timing motor, a vertical shaft driven by said timing motor, terminations of said tubes disposed on either side of said shaft, a semicircular tray fixed to said shaft receiving flow from said terminations when said tray is below said terminations, said tray having a central portion, walls extending outward from central portion forming an angle of less than 180 degrees, and a circular wall connecting the ends of said walls, said tray containing a channel draining said tray substantially below the center of rotation of said tray, and a drain pan fixed below said tray containing a first drain aperture below the center of rotation of said tray and a second drain aperture, fluid flowing from said tray draining through the channel in said tray through the first drain aperture in said drain pan and flow from said terminations beyond said tray draining from said drain pan through the second drain aperture.

6. A water treatment electrodialysis apparatus comprising, in combination, a cabinet, an inlet pipe for water to be treated entering said cabinet, a filter, a solenoid valve, a pressure regulating valve, a low pressure cut off switch, said valves, said filter and said cut off switch being connected in line to said inlet pipe, an electrodialysis stack disposed vertically in said cabinet, said electrodialysis stack having gaskets containing at least two fluid flow apertures, a through flow aperture and a large cut out portion, membranes interspersed between said gaskets forming alternate concentrating and diluting cells within the cut out portions of said gaskets, electrode compartment forming gaskets containing at least two manifold apertures, a through flow aperture and a cut out portion forming an electrode compartment, an inlet plate containing an inlet aperture and at least one slot in the inner surface of said inlet plate communicating with said inlet aperture, the cut out portion, a through flow aperture and the manifold apertures of the adjacent electrode compartment forming gasket, and an outlet plate having two outlet apertures communicating with the manifold apertures in an adjacent electrode compartment forming gasket and having at least one slot formed in its inner surface communicating between the through flow aperture and the cut out portion of the adjacent electrode compartment forming gasket, a tube connecting the inlet aperture in said inlet plate of said stack with said valves, said filter and said low pressure cut off switch, means to provide a direct current source within said cabinet and connected to said stack, outlet tubes carrying product and concentrate streams leading from said stack, a timing motor within said cabinet, a vertical shaft driven by said timing motor terminations of said tubes disposed on either side of said shaft, a semicircular tray fixed to said shaft receiving flow from each of said terminations when said tray is below said terminations, said tray containing a channel draining said tray substantially below the center of said tray, a drain pan fixed below said tray containing a first drain aperture below the center of rotation of said tray and a second drain aperture, electrode chamber outlet tubes projecting from the upper sides of said electrodialysis stack leading from the electrode chambers, two extensions of said drain pan disposed on each side of said electrodialysis stack receiving flow from said outlet tubes, said extensions of said drain pan and flow from said terminations beyond said tray draining into the bottom of said cabinet through said second drain aperture, means driven by said timing motor to periodically reverse the connection of said direct current source to said stack when said tray has turned so that flow from one of said terminations is beyond said tray, a product reservoir filled by one of said outlet tubes, a fluid level switch actuated by the fluid level within said product reservoir, means to draw off treated water from said product reservoir, and an alternating current source connected to said cabinet, said alternating current source being connected through said level switch to said solenoid valve and said alternating current source being connected to said means to provide a direct current and to said timing motor through said level switch and said pressure switch.

7. The combination according to claim 6 wherein said vertical shaft completes one revolution between one-half hour and six hours.

8. In an electrodialysis apparatus having an electrodialysis stack, electrodes in said stack, a direct current source connected to said electrodes, tubes emerging from said stack conveying a product and a concentrate stream, and a current reversal device; a stream diverting means comprising, in combination, a timing motor activating said current reversal device, at least one open container rotated in a circular path by said timing motor, said container having a drain aperture, said tubes terminating above the path of rotation of said container, and drain means receiving flow from the drain aperture in said container.

9. In an electrodialysis apparatus having an electrodialysis stack, electrodes in said stack, a direct current source connected to said electrodes, tubes emerging from said stack conveying a product and a concentrate stream, and a current reversal device; a stream diverting means comprising, in combination, a timing motor activating said current reversal device, at least one open container rotated in a circular path by said timing motor, said container having a drain aperture in the center of rotation of said container, said tubes terminating above the path of rotation of said container, and a drain tray located below said container and containing a product stream drain aperture below the center of rotation of said container, said drain tray having flow from the drain aperture of said container pass through the product stream drain aperture.

10. The combination according to claim 9 wherein said drain tray contains a waste stream aperture, said tubes draining beyond said container flowing into the waste stream aperture.

References Cited in the file of this patent

UNITED STATES PATENTS

| 2,572,974 | Berger | Oct. 30, 1951 |
| 2,863,813 | Juda | Dec. 9, 1958 |
| 2,977,437 | Doane | Mar. 28, 1961 |